United States Patent Office 3,045,845
Patented July 24, 1962

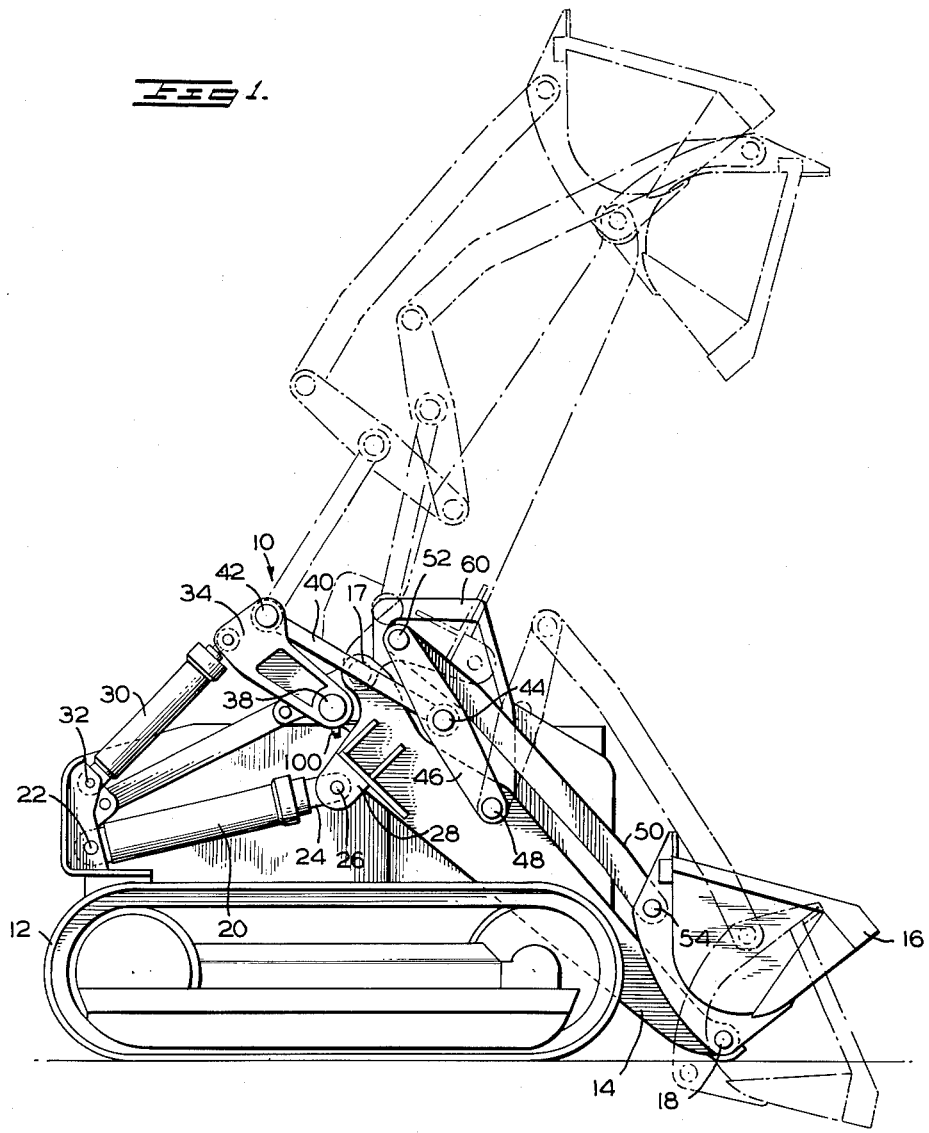

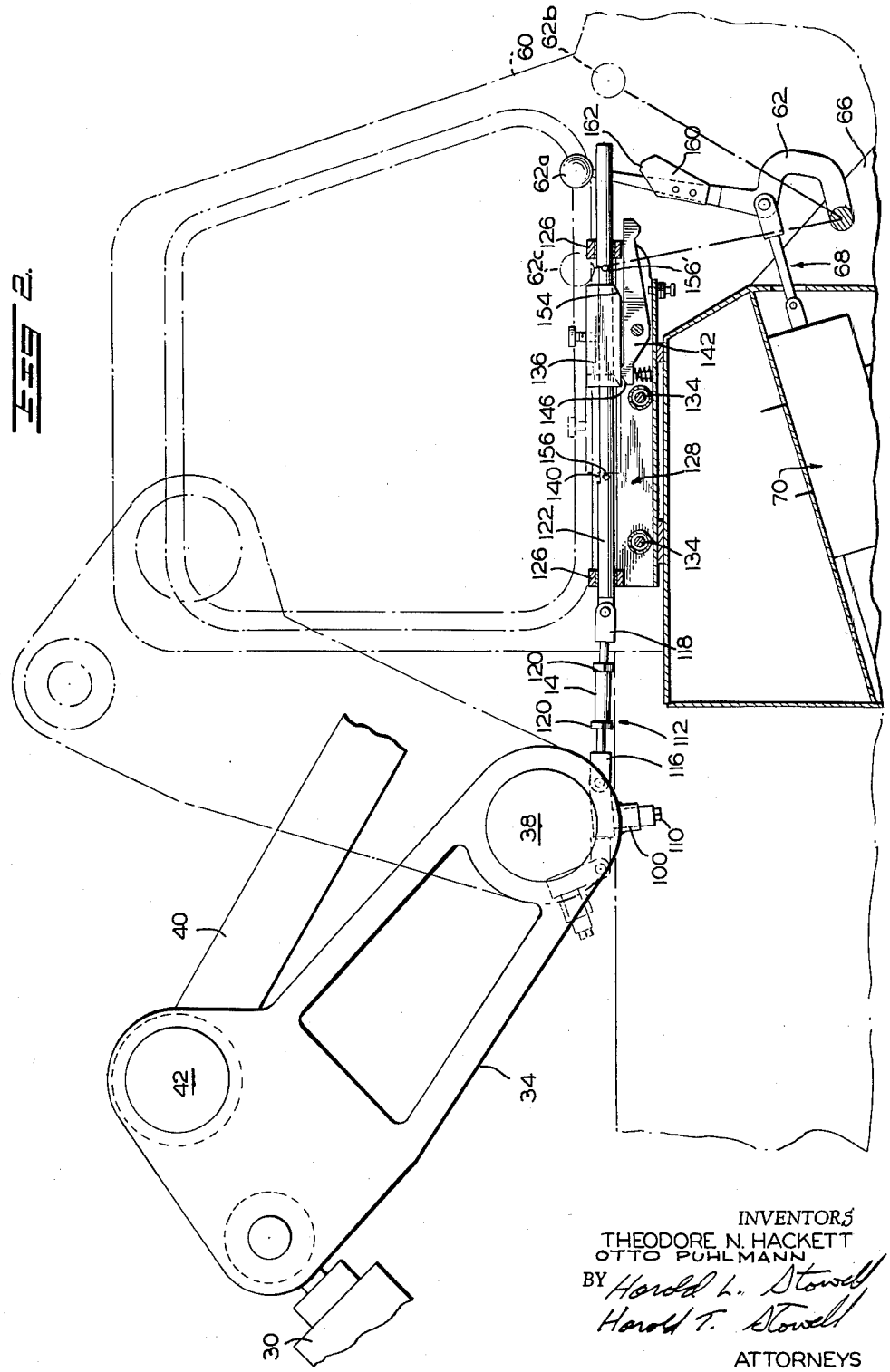

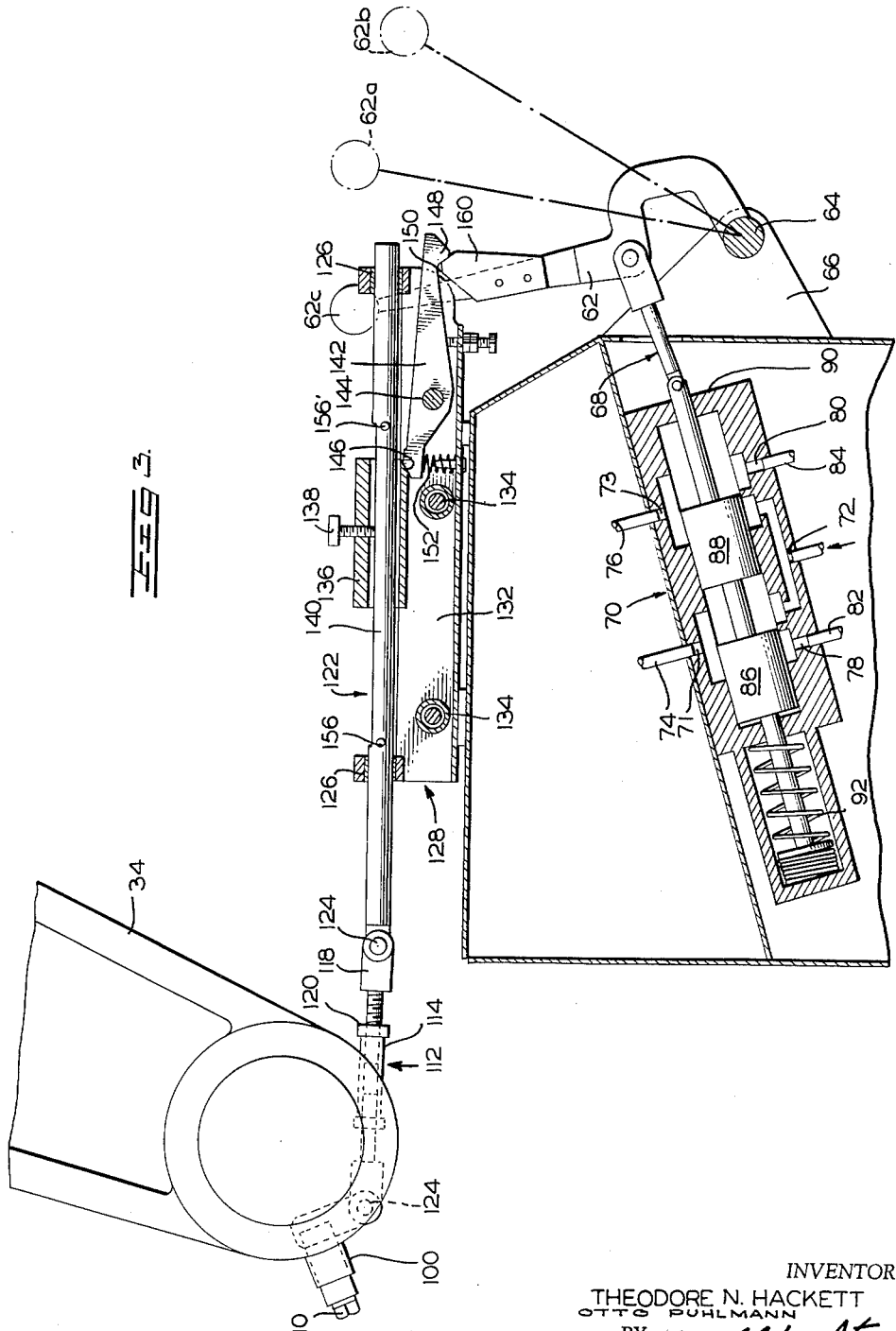

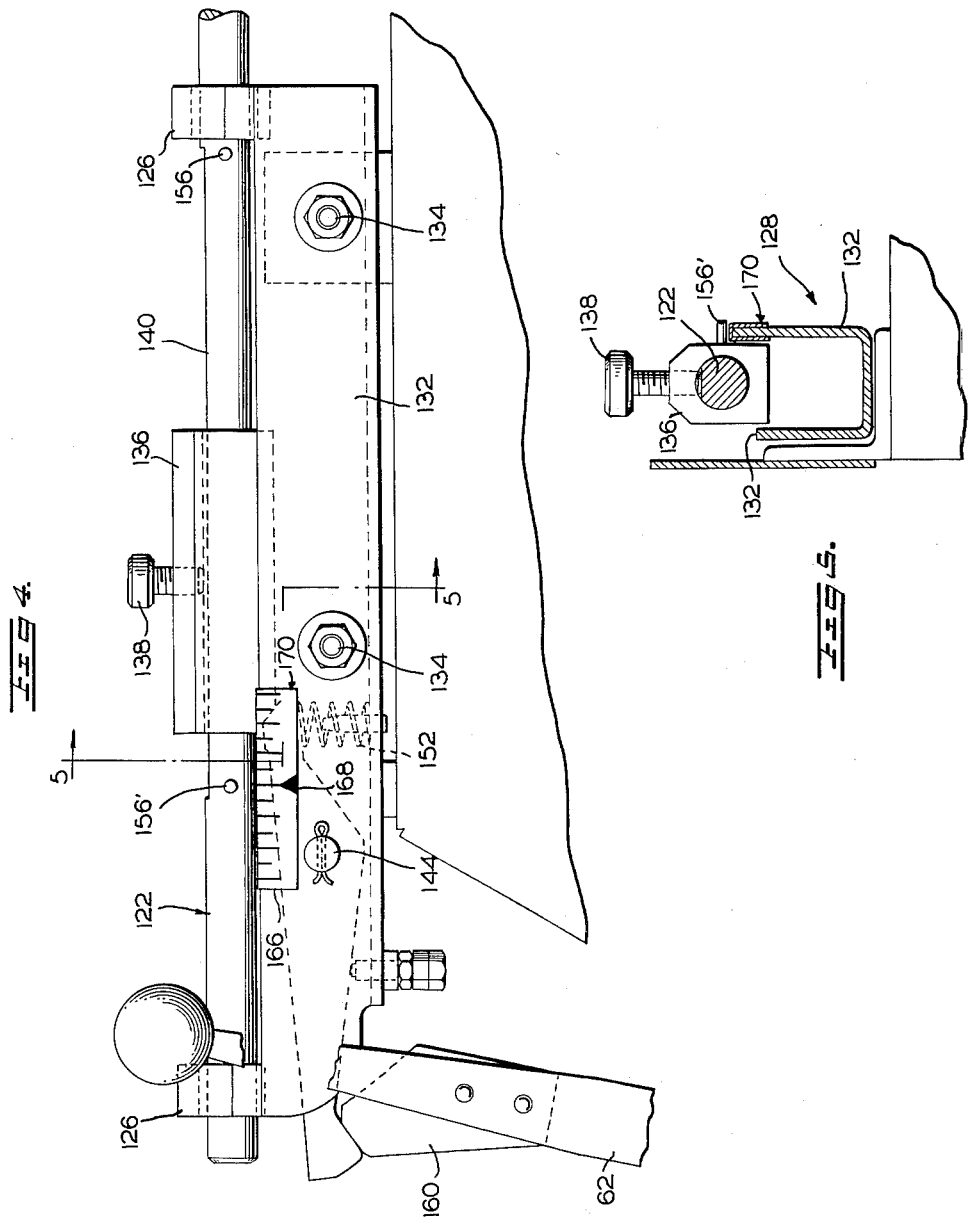

3,045,845
IMPLEMENT POSITION CONTROL AND
INDICATOR MEANS
Theodore N. Hackett and Otto Puhlmann, Salt Lake City, Utah, assignors to The Eimco Corporation, Salt Lake City, Utah, a corporation of Delaware
Filed Aug. 20, 1958, Ser. No. 756,193
1 Claim. (Cl. 214—140)

This invention relates to improved implement position control and indicator means and, more particularly, to implement position and control means for material handling machines wherein in the normal duty cycle of the implement it is desired to position the implement in an attitude intermediate a range of travel thereof.

The invention will be more particularly described with reference to the incorporation of a new and improved implement position control and indicator means on a material handling machine of the front end loader type which includes a shovel bucket adapted to muck material at a low forward digging position, to lift the bucket clear of the ground for transport by the material handling machine to a material dumping area, and then to place the bucket in a position where the mucked material will be discharged from the bucket. While the invention will be described in such particularity, it will be apparent that the improved implement position control and indicator means may be employed on material handling machines having diverse material handling implements such as logging forks, scraper and dozer blades, and drill rigs and the like.

It is an object of the invention to provide an implement position control and indicator means that can be adjusted by the operator to disconnect the flow of power to the implement position changing mechanism at any attitude in the path of travel of the implement.

It is a further object to provide such a device including a visual implement position indicating means.

It is a further object to provide means whereby the operator may override automatic power cut-off means and position the implement where desired.

Another object of the present invention is to provide implement position control and indicator means that may be attached to existing material handling machines at a minimum expense.

A further object is to provide such a device that is relatively simple in construction, dependable and versatile in use.

These and other objects and advantages are provided in a material handling machine having a material handling implement mounted for relative movement thereon; means for moving the implement relative to the machine including a power source, linkage means interconnecting the power source and the implement; a manual control lever having at least a power "on" and a power "off" position for controlling the application of power from the power source to the linkage means; releasable means maintaining the control lever in a power "on" position; and means connected to said linkage means for releasing the releasable means.

The principles of the invention will be more readily apparent to those skilled in the art from the following detailed description and accompanying drawings, wherein:

FIG. 1 is a side elevational view of a crawler mounted tractor supporting a front end loading device having the new and improved implement position control means attached thereto;

FIG. 2 is an enlarged fragmentary sectional view of a portion of the cab structure of the machine shown in FIG. 1;

FIG. 3 is an enlarged fragmentary view in partial section of the implement position control and indicator means illustrated in FIG. 2;

FIG. 4 is a fragmentary eelvational view of the implement position control and indicator means of the invention showing the left side wall 132; and FIG. 5 is a section substantially on line 5—5 of FIG. 4.

Referring to FIG. 1 of the drawings, 10 generally designates a mobile material handling machine mounted on conventional crawler treads 12. The material handling machine includes a front end material handling structure including a boom 14 which is pivotally mounted at 17 to the superstructure of the vehicle. At the extended end of the boom 14 a pivot pin 18 pivotally mounts a shovel bucket generally designated 16. The boom 14 is pivoted from its low forward position shown in solid lines to an upwardly extending position, shown in broken lines, by a hydraulic ram 20.

The hydraulic ram 20 is pivotally mounted to the main frame of the vehicle as at 22 while the extended end of the piston rod 24 of the ram is pivotally connected as at 26 to boss 28 integral with the boom below the boom's pivotal connection to the frame of the vehicle.

The front end material handling implement also includes means for pivoting the bucket 16 relative to the boom 14. The means for pivoting the bucket 16 includes a hydraulic ram 30 which is pivotally connected to the frame of the vehicle as at 32 and to a bell crank or lever 34. The bell crank 34 is pivoted to the superstructure of the material handling machine at 38 and also to an arm 40 by pivot pin 42. The other end of arm 40 is center connected as at 44 to a cross arm 46. The lower end of the cross arm 46 is pin connected at 48 to the boom 14 at a point intermediate its ends while the other end of the cross arm 46 is pivotally connected to a link or rod 50 by pivot pin 52. The lower end of link 50 is connected by pivot pin 54 to an upper portion of the muck bucket 16 at a point spaced from the pivotal connection between the bucket and the boom 14.

An identical system of boom, lever arms, bell crank, links, and hydraulic rams is provided on the other side of the material handling machine whereby upon directing pressure fluid to the hydraulic rams 20, the pair of booms 14 are pivoted about the axis of the pivot pins 17 and raised to the extended position as shown in broken lines in FIG. 1 of the drawings which, in turn, lifts the shovel bucket from a low material gathering position to an upward material transport or dumping position. Upon directing pressure fluid to the hydraulic rams 30, the muck bucket 16 is pivoted about the axis of the pivot shaft 18 for dumping or transporting the mucked load.

Conventional controls for directing pressure fluid to and from the hydraulic rams 20 and 30 may be employed on the material handling machine or the new and improved hydraulic system shown and described in U.S. patent application, T. N. Hackett et al., Serial No. 700,-821, filed December 5, 1957, may be employed.

The improvement of the present invention will be described in detail with reference to FIGS. 2 and 3 with the bucket position control and indicator means being interconnected with the mechanism for tilting the bucket to enable the operator to return the bucket from the dump position back to such an attitude with respect to the lift arm that when the lift arm is lowered to the ground level the bucket lip will be in the proper position for digging. The structure of the invention will also be described with reference to a bucket position indicating means to enable the operator to know the position of the bucket without actually seeing the bucket lip.

Referring to FIGS. 2–5, 60 designates the control cab of the material handling machine shown in FIG. 1. Within the control cab is mounted a manual control lever 62 which control lever is movable from a neutral position 62a forwardly to a bucket dump position 62b and rearwardly to a bucket rollback position 62c. In FIG. 2, the manual control handle 62 is illustrated in the neutral position while in FIG. 3 the control handle is in the bucket rollback position 62c.

The manual control lever 62 is pivoted about integral shaft 64 journalled in suitable bearings not shown supported by a portion 66 of the frame of the vehicle. The lever 62 is connected by rod means 68 to a flow control valve generally designated 70 for directing pressure fluid to and from the hydraulic rams 30. The control valve 70 includes a pressure fluid inlet port 72; a port 71 connected to the head ends of the hydraulic rams 30 through conduit 74; a port 73 connected to the remote ends of the hydraulic rams 30 through conduit 76; and a pair of ports 78 and 80 which, in turn, are connected to lines 82 and 84 which return the hydraulic fluid to sump.

Referring specifically to FIG. 3 with the control handle 62 in the rollback position as illustrated pressure fluid from a source of pressure fluid not shown enters the valve through port 72, flows between valve spool portions 86 and 88 to outlet port 71, thence through conduit 74 to the head ends of hydraulic rams 30. The pressure fluid at the remote ends of the pistons returns to the sump through conduit 76, valve port 73 and then between the valve spool portion 88 and the head 90 of the valve to flow out of valve port 88 through conduit 84 to the hydraulic reservoir, not shown. When the control handle 62 is returned to the neutral position 62a, valve spool portion 86 blocks the flow of pressure fluid in conduit 74 while valve spool portion 88 blocks the flow of pressure fluid in conduit 76 whereby the bucket may be maintained in any desired position within the limits of the stroke of the hydraulic rams 30 by merely positioning the manual control lever 62 in the neutral or blocked position.

By placing the manual control lever 62 in the bucket dump position 62b, pressure fluid is directed to the rear of the hydraulic rams through conduit 76 and the pressure fluid at the forward ends of the pistons returns to sump through conduit 74 and the valve.

The valve 70 also includes a spool and control handle centering spring mechanism generally designated 92 whereby the valve spool and the control handle 62 are urged to the neutral position 62a. To place the control handle in either the bucket rollback or bucket dump position 62c or 62b, it is necessary for the operator to overcome the force of the centering spring mechanism 92.

A control arm 100 is connected to, for example, the right hand main dump lever or bell crank 34 as by screws 110. An adjustable control rod assembly 112, the length of which is adjusted via rotation of the rod 114 on threaded shanks of yokes 116 and 118 and then locked by jam nuts 120, connects control arm 100 to trip rod 122 with yokes 116 and 118 and rod end pins 124. The trip rod 122 extends from its yoke connection with control rod 100 outside the loader cab 60 through an opening in the rear of cab and along inside the cab at the operator's right. Trip rod 122 is supported for longitudinal sliding movement by bushing assemblies 126 at each end of a bracket assembly 128. Bracket assembly 128 which is a U channel with spaced side walls 132 is mounted in cab 60 by nut and bolt assemblies 134.

A trip block 136 is fixed in position on trip rod 122 by adjusting screw 138 which is tightened down to engage longitudinally extended flat surface 140 of the trip rod. A detent lever 142 is pivotally mounted by pivot mount means 144 which extends between U channel side walls 132. Lever 142, which is formed with bevelled end 146 at one end and detent projection 148 and groove 150 at the other end, is normally resiliently biased by spring means 152 with the bevelled end 146 engaging trip rod 122. Trip block 136 is provided with a bevelled surfact 154 which is brought into operative contact with bevelled end 146 of lever 142 within the range of movement of trip rod 122 for most of the set positions of trip block 136 on the trip rod. However, surface 140 of rod 122 extends sufficiently far and limit pins 156, 156' so spaced as to permit set positions of trip block 136 on rod 122 that will not engage and trip lever 142 throughout the entire range of trip rod movement and bucket rollback motion would continue to the limit of its actuating means stroke.

A bevel ended detent bar 160 is mounted on the bucket dump control lever 62 so that as the bucket dump control lever 62 is brought to the bucket rollback position the bevel ended detent end of detent bar 160 overcomes the resilient bias transmitted to lever 142 by spring means 152 rides over detent projection 148 and seats in detent groove 150. Although normally this is effective to hold the bucket dump lever 62 in the bucket rollback position until detent lever 142 is tripped by tripblock 136 the operator can overcome the bias force of spring means 152 and move the bucket dump lever 62 to any of its positions at any time.

Limit pins 156 and 156' are mounted in trip rod 122 to limit the adjustable range of longitudinal position settings thereon of trip block 136 and prevent its being set in such a position thereon as to come into damaging abutment with one or the other of bushing assemblies 126. The forwardmost pin 156' also functions as an indicator for a bucket position indicating scale 166 located for easy viewing on the upper forward portion of a bracket assembly side wall 132. Adjustable control rod 122 can be so adjusted that the forward pin 156' points as an indicator to one identified mark 168 of scale 166 when the bucket, for example, is at the ideal desired attitude for digging. Bucket position indicating scale 124 can be printed on a plate 170 which fits over the upper edge of a bracket assembly side wall 132 and which may be readily positioned for proper register with the indicator pin 156' as shown in FIG. 4.

In operation as main dump lever or bell crank 34 moves trip rod 122 moves. The bucket is dumped by manually moving control lever 62 to the dumped position 62b. Then with bucket dump control lever 62 having thereafter been moved into the bucket rollback position 62c illustrated in FIGS. 3 and 4 the lever 62 is held by detent lever 142 until the trip block 136 bevelled surface 154 is brought into contact with and overrides bevelled end 146 of lever 142. This trips detent lever 142 thereby releasing detent bar 160 and bucket dump control lever 62 which are automatically moved to the hold or neutral position 62a by means of a centering spring means 92 in the bucket dump control valve 70. This stops the bucket rollback motion at the position predetermined by the trip block 136 position setting.

From the foregoing description, it will be apparent that only the control mechanisms for the rollback and dumping of the shovel bucket 16 have been described as being equipped with the automatic implement position control and indicator means. A further control handle, not shown, is connected to a suitable valve for directing pressure fluid to and from the hydraulic ram 20 connected between the frame of the vehicle and the boom 14. It will be appreciated that this further control handle may also be provided with the novel control means of this invention described with reference to the bucket rollback manual control lever 62 whereby positioning of the boom 14 may also be automatically achieved. It will also be apparent that other forms of material handling implements may be automatically positioned through the use of the implement positioning and indicator means hereinabove described and that the manual control lever 62 may readily be connected to electric motors for actuating the bucket and boom or to rack and pinion or other actuating mechanisms without departing from the scope of the present invention.

Having described the principles of this invention including a full embodiment of means interconnecting the implement position control and indicator means to a ma-

We claim:

In a material handling machine including a material handling implement, members operatively interconnecting the implement and a power source for moving said implement about an axis transverse to the machine, a manual control lever having at least a power on and a power off position for controlling the application of power from the power source to the material handling implement through said members, linkage means actuated by movement of said members, an indicator member adjacent the control lever continuously movable in response to movement of the linkage means to indicate relative radial movement of the material handling implement, latch means directly engageable with the control lever and when engaged therewith maintaining the control lever in a power on position, a latch release member adjustably mounted on said indicator member for releasing said latch means from engagement with the control lever.

References Cited in the file of this patent

UNITED STATES PATENTS

| | | |
|---|---|---|
| 1,855,420 | Robb | Apr. 26, 1932 |
| 2,114,157 | Towson | Apr. 12, 1938 |
| 2,643,011 | Brisson et al. | June 23, 1953 |
| 2,853,200 | Beyerstedt | Sept. 23, 1958 |
| 2,883,077 | Pilch | Apr. 21, 1959 |